US012000547B1

(12) United States Patent
Lands et al.

(10) Patent No.: US 12,000,547 B1
(45) Date of Patent: Jun. 4, 2024

(54) EDGE-MOUNT LIGHT PIPE

(71) Applicant: Adtran, Inc., Huntsville, AL (US)

(72) Inventors: Adam Keith Lands, New Market, AL (US); Jon M. Chalmers, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 18/313,628

(22) Filed: May 8, 2023

(51) Int. Cl.
*F21K 9/61* (2016.01)
*F21V 21/088* (2006.01)

(52) U.S. Cl.
CPC .............. *F21K 9/61* (2016.08); *F21V 21/088* (2013.01); *F21V 2200/40* (2015.01)

(58) Field of Classification Search
CPC ................................. F21K 9/61; F21V 21/088
See application file for complete search history.

(56) References Cited

U.S. PATENT DOCUMENTS

| | | | | |
|---|---|---|---|---|
| 5,938,324 | A * | 8/1999 | Salmon | G09F 9/305 362/555 |
| 6,969,186 | B2 * | 11/2005 | Sonderegger | G02B 6/4298 362/555 |
| 7,036,971 | B2 * | 5/2006 | Kuo | G02B 6/001 362/558 |
| 7,421,184 | B2 * | 9/2008 | Long | G02B 6/0008 439/490 |
| 2009/0161359 | A1 * | 6/2009 | Siemiet | F21S 4/28 362/249.02 |
| 2012/0169227 | A1 * | 7/2012 | Chidiac | F21K 9/61 315/35 |
| 2015/0285980 | A1 * | 10/2015 | Preston | G02B 6/0008 362/555 |
| 2018/0274751 | A1 * | 9/2018 | Kennedy | G02B 6/0096 |
| 2018/0345846 | A1 * | 12/2018 | Alisafaee | F21S 43/31 |
| 2019/0094443 | A1 * | 3/2019 | Gobron | G02B 19/0028 |

* cited by examiner

*Primary Examiner* — Bryon T Gyllstrom
(74) *Attorney, Agent, or Firm* — Smith Tempel Blaha LLC/Adtran; Michael J. Tempel

(57) ABSTRACT

A light pipe device may have a substantially U-shaped base with first and second leg portions. One or more light pipes may extend from one or both of the leg portions. The light pipe device may be mounted to a printed circuit board (PCB) by clipping the U-shaped based onto an edge of the PCB.

20 Claims, 4 Drawing Sheets

EDGE-MOUNT LIGHT PIPE

BACKGROUND

A light pipe is a device commonly used in electronic equipment assemblies for transmitting light from a light-emitting diode (LED) or other light source to a faceplate, where it is not feasible to mount the light source directly behind the faceplate. A light pipe may be made of a molded, optically translucent plastic material, such as, for example, polycarbonate. The principle of total internal reflection or "TIR" enables the light pipe to transmit light along its length, in a manner similar to that in which TIR enables an optical fiber to transmit light.

A first end of a light pipe may be mounted on a printed circuit board (PCB), adjacent an LED. To secure the light pipe to the PCB, mounting pins on the first end of the light pipe may be pressed into holes in the PCB. The second end of the light pipe may extend into a hole in a faceplate. A straight light pipe may be employed where the PCB is parallel to the faceplate. A light pipe having a 90-degree bend may be employed where the PCB is perpendicular to the faceplate. When the LED is illuminated, the light is transmitted through the light pipe and is visible on the faceplate to an observer, such as a user of the electronic equipment.

Space and clearance constraints may make it challenging to mount a light pipe on a PCB in an electronic equipment assembly. It would be desirable to provide an improved light pipe device that facilitates mounting to a PCB or provides other advantages.

SUMMARY

In accordance with an aspect of the present disclosure, a light pipe device may include a substantially U-shaped base having a central portion and first and second leg portions extending substantially parallel to each other from the central portion. The light pipe device may also include at least one light pipe extending from one of the leg portions.

In accordance with another aspect of the present disclosure, a method for mounting a light pipe device on an electronic assembly substrate may include attaching a substantially U-shaped base of the light pipe device to an edge of the substrate. The attaching action may include positioning the substrate between first and second leg portions extending from a central portion of the U-shaped base. The attaching action may include positioning a proximal end of a light pipe extending from one of the leg portions over a light source on the substrate.

In accordance with still another aspect of the present disclosure, an apparatus may include means for attaching to an edge of a substrate. The apparatus may also include means for transmitting light from a light source on the substrate proximate to the means for attaching to a location distant from the means for attaching.

Other devices, systems, methods, features, and advantages will be or become apparent to one with skill in the art upon examination of the following figures and detailed description. It is intended that all such additional devices, systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
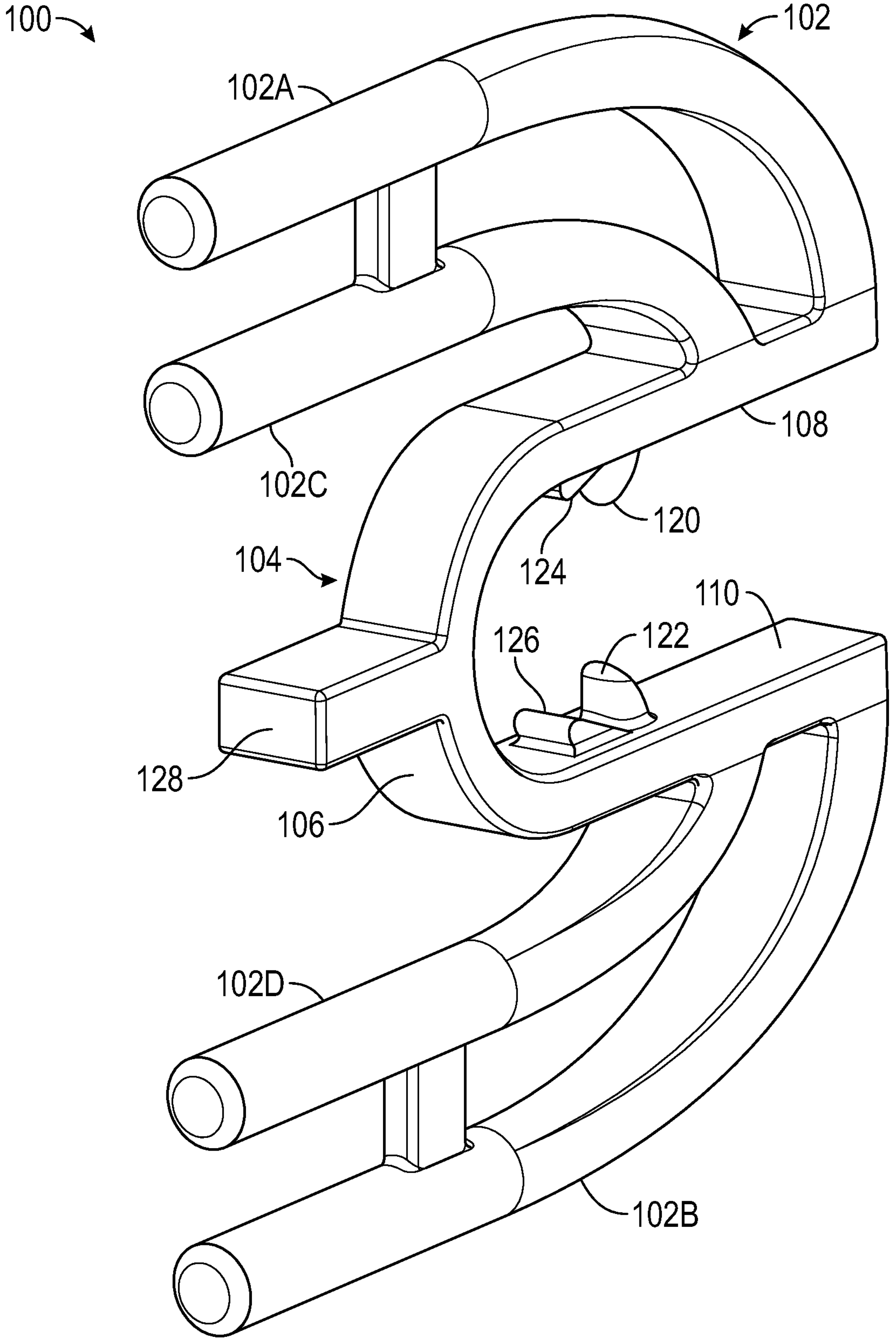
FIG. 1 is a perspective view of a light pipe device, in accordance with an exemplary embodiment.
Figure 2:
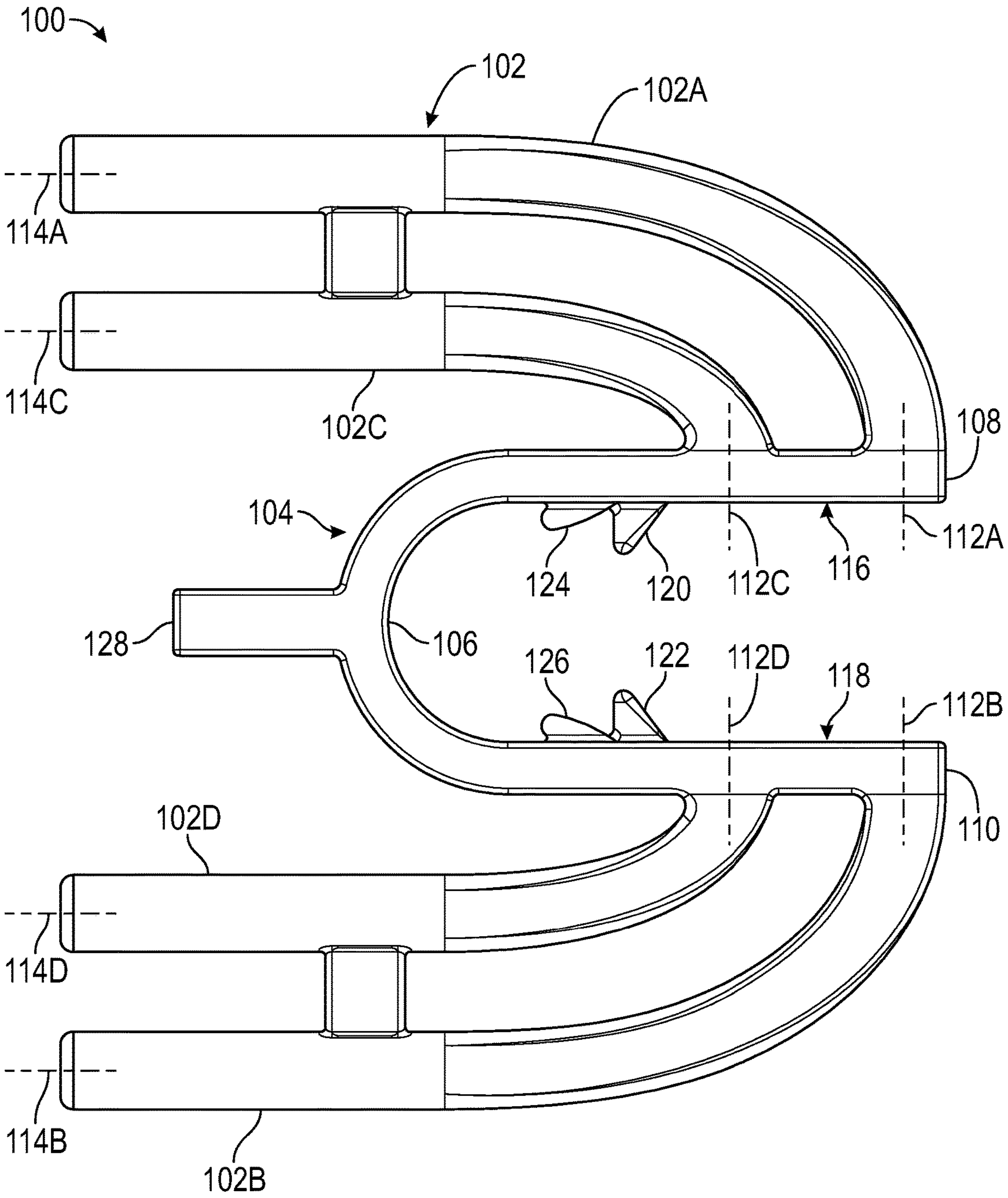
FIG. 2 is a side elevation view of a light pipe device, in accordance with an exemplary embodiment.

As illustrated in FIGS. 1-2, in an illustrative or exemplary embodiment, a light pipe device 100 may include one or more light pipes 102 and a base 104. In the exemplary embodiment, the light pipe device 100 may include four light pipes 102: a first light pipe 102A, a second light pipe 102B, a third light pipe 102C, and a fourth light pipe 102D. Nevertheless, in other embodiments (not shown) there may be more or fewer such light pipes. It should be understood that the terms "first," "second," "third," and "fourth" are used herein for convenience and should not be interpreted as implying an order, position, etc. Each light pipe 102 may have a solid, elongated shape and may be made of a translucent plastic material, such as, for example, polycarbonate. Each light pipe 102 may extend from the base 104.

The base 104 may be substantially U-shaped and may comprise a central portion 106, a first leg portion 108 extending from the central portion 106, and a second leg portion 110 extending from the central portion 106 substantially parallel to the first leg portion 108. In the exemplary embodiment (FIGS. 1-2), the central portion 106 thus may be substantially C-shaped, but may be more angular or have other shapes or structural features in other embodiments (not shown). Although in the exemplary embodiment the first and second leg portions 108 and 110 may have substantially rectangular cross-sectional shapes, in other embodiments (not shown) the leg portions may have other cross-sectional shapes.

In the exemplary embodiment, a proximal end of the first light pipe 102A and a proximal end of the third light pipe 102C are located at the first leg portion 108, while a proximal end of the second light pipe 102B and a proximal end of the fourth light pipe 102D are located at the second leg portion 110. The first light pipe 102A and third light pipe 102C thus extend away from the first leg portion 108, while the second light pipe 102B and the fourth light pipe 102D thus extend away from the second leg portion 110. Nevertheless, in other embodiments (not shown) a light pipe device may have one or more light pipes extending from only one of the two leg portions of the base and have no light pipes extending from the other of the two leg portions of the base. Although in the exemplary embodiment two light pipes 102A and 102C extend from the first leg portion 108, and two light pipes 102B and 102D extend from the second leg portion 110, in other embodiments having light pipes extending from both leg portions a different number of light pipes may extend from one leg portion than from the other leg portion.

In the exemplary embodiment (FIGS. 1-2), each light pipe 102 has a curvature or bend. In the exemplary embodiment, each light pipe 102 bends 90 degrees between its proximal and distal ends. In FIG. 2 it may be noted that the optical axis 112A, 112B, 112C, and 112D of the proximal end of each of the light pipes 102A, 102B, 102C, and 102D, respectively, is oriented at a substantially right angle (i.e., substantially 90 degrees) to the respective optical axis 114A, 114B, 114C, and 114D of the distal end of each of the light pipes 102A, 102B, 102C, and 102D, respectively. The term "optical axis" as used herein refers to the direction in which the optical energy is concentrated as it is conveyed through the light pipe 102. Although in the exemplary embodiment each light pipe 102 bends substantially 90 degrees between its proximal and distal ends, in other embodiments (not shown) such a light pipe may have a different amount of curvature between its proximal and distal ends, may be straight (i.e., no curvature between its proximal and distal ends), may have multiple curvatures (e.g., an S-curve), etc.

It may also be noted that in the exemplary embodiment the optical axis 112A of the proximal end of the first light pipe 102A and the optical axis 112C of the proximal end of the third light pipe 102A are substantially normal to the inside surface 116 of the first leg portion 108, while the optical axis 112B of the proximal end of the second light pipe 102B and the optical axis 112D of the proximal end of the fourth light pipe 102D are substantially normal to the inside surface 118 of the second leg portion 110.

Accordingly, in the exemplary embodiment the optical axis 114A of the distal end of the first light pipe 102A and the optical axis 114C of the distal end of the third light pipe 102A are substantially parallel to the first leg portion 108, while the optical axis 114B of the distal end of the second light pipe 102B and the optical axis 114D of the distal end of the fourth light pipe 102D are substantially parallel to the second leg portion 110. The term "substantially" is used herein (e.g., substantially 90 degrees, substantially parallel, substantially normal, etc.) to take into consideration, as understood by one of ordinary skill in the art, that precise optical alignment may not be required for a light pipe 102 to transmit light sufficiently to serve its purpose of providing a visual indication to a user. The term "substantially" also recognizes that the first and second leg portions 108 and 110 may flex with respect to each other in the manner described below or, in other embodiments (not shown) may be movable in another manner with respect to each other. Further, the first and second leg portions 108 and 110 may include contours, ramped surfaces, or other surface features for enhancing the clipping action described below.

In the exemplary embodiment, the first and second leg portions 108 and 110 may include first and second detents 120 and 122, respectively. The first and second detents 120 and 122 may be protrusions extending away from the lower surfaces 116 and 118, respectively, of the first and second leg portions 108 and 110. The first and second detents 120 and 122 may have ramped shapes to facilitate the clipping action described below with regard to a method of mounting the light pipe device 100. In the exemplary embodiment, the first and second leg portions 108 and 110 may also include spacer protrusions 124 and 126, respectively, which may also be involved in mounting the light pipe device 100, as described below.

In the exemplary embodiment, each light pipe 102 may have a circular cross-sectional shape at its distal end and transition to a rectangular cross-sectional shape at its proximal end so as to match the rectangular cross-sectional shape of the first and second leg portions 108 and 110. Nevertheless, in other embodiments a light pipe may have any other cross-sectional shape or combination of cross-sectional shapes between its proximal and distal ends. Further, in other embodiments having multiple light pipes, the light pipes may differ from each other in cross-sectional shape, curvature, direction in which they extend, etc.

In the exemplary embodiment, the base 104 may also include an extension portion 128. The extension portion 128 may extend from the central portion 106 of the base 104 in a direction opposite the direction in which the first and second leg portions 108 and 110 extend from the central portion 106. The extension portion 128 may extend parallel to the first and second leg portions 108 and 110. The functions of the extension portion 128 are described below in relation to a method of mounting the light pipe device 100.

Note in the exemplary embodiment that the first and second leg portions 108 and 110 are identical, and the light pipe device 100 is otherwise symmetrical. Nevertheless, in other embodiments (not shown) the leg portions may differ structurally or functionally from each other.

Figure 3:
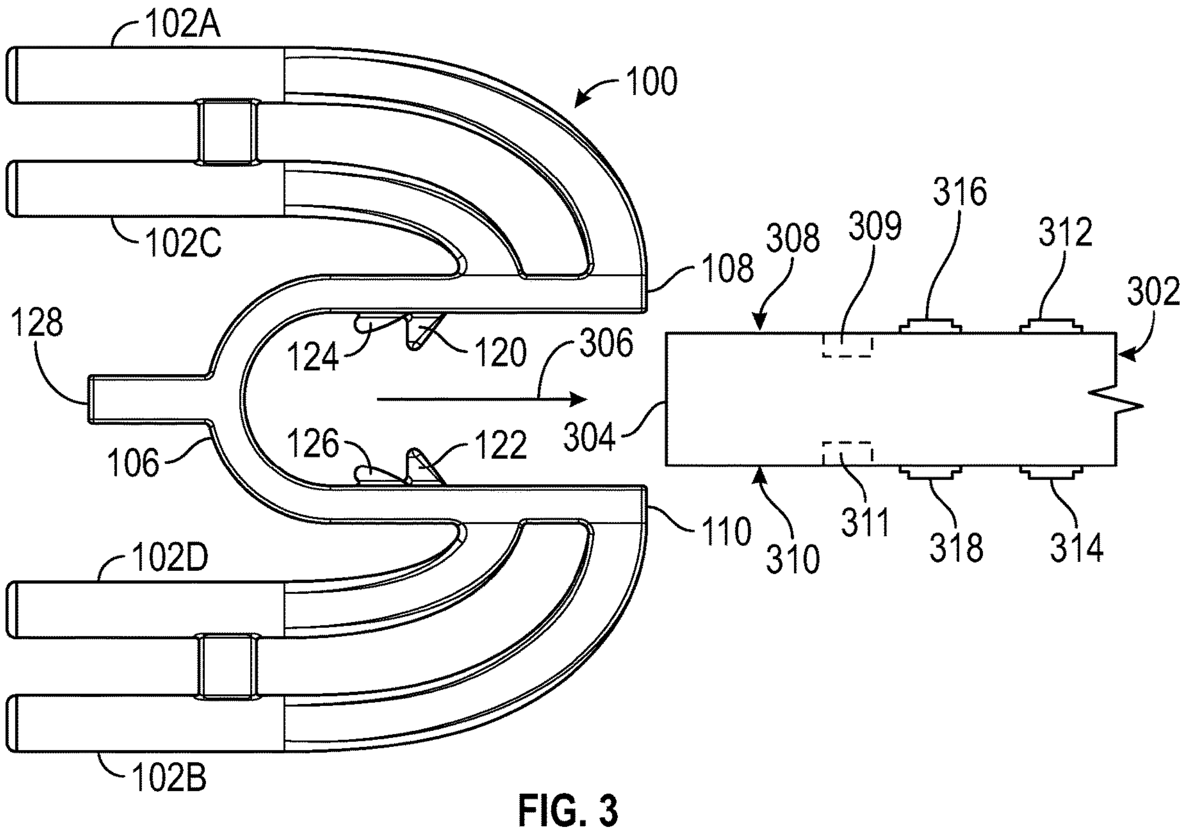
FIG. 3 is a side elevation view of a light pipe device and printed circuit board, illustrating the beginning of a method for mounting the light pipe device on the printed circuit board, in accordance with an exemplary embodiment.

As illustrated in FIG. 3, a method for mounting the light pipe device 100 on a printed circuit board (PCB) 302 may begin by orienting the light pipe device 100 with the edge 304 of the circuit board 302 aligned with the "U" channel formed by the first and second leg portions 108 and 110. Although not shown for purposes of clarity, a person, industrial robot, or other assembler may conveniently grip the light pipe device 100 by the extension 128. Note that in the exemplary embodiment the extension portion 128 has a grippable tab shape.

The assembler may then move the light pipe device 100 in the direction of the arrow 306 (i.e., toward the PCB 302). As the light pipe device 100 is moved in this manner, the first and second leg portions 108 and 110 engage the PCB 302. That is, the first and second leg portions 108 and 110 move over the opposing surfaces 308 and 310, respectively, of the PCB 302, trapping or clipping the PCB 302 between the first and second leg portions 108 and 110. As the first and second leg portions 108 and 110 move over the opposing surfaces 308 and 310 of the PCB 302, the ramped or sloped edges of the detents 120 and 122 may ride up the edge 304 of the PCB 302 and resiliently deflect or flex the first and second leg portions 108 and 110, spreading them apart slightly (not shown). The detents 120 and 122 may engage holes or recesses 309 and 311 (FIG. 3) in the opposing surfaces 308 and 310, respectively, of the PCB 302. When the detents 120 and 122 drop into the holes 309 and 311, the first and second leg portions 108 and 110 may relax from their flexed positions.

Figure 4:
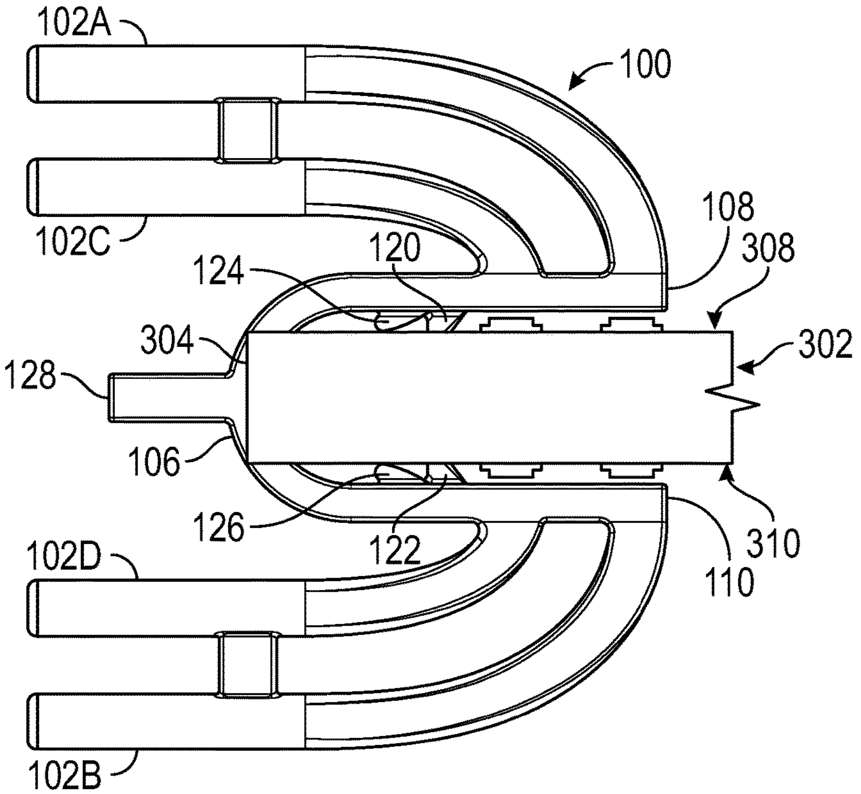
FIG. 4 is similar to FIG. 3, illustrating the light pipe device mounted on the printed circuit board, in accordance with an exemplary embodiment.

In FIG. 4, the light pipe device 100 is shown fully mounted to or engaged with the PCB 302. In this fully engaged position, the first and second leg portions 108 and 110 are parallel to each other, the detents 120 and 122 rest in the holes 309 and 311 (FIG. 3), and the central portion 106 may be engaged with a notch (not shown) in the edge 304 of the PCB 302. Although the holes and notch in the PCB 302 may enhance the engagement security in the exemplary embodiment, in other embodiments other engagement mechanisms or other ways of attaching a light pipe device to the edge of a structure may be employed. Attaching a light pipe device may include the use of adhesive, fasteners, etc., in addition to, or alternatively to, mechanical engagement by the leg portions.

One or more light sources, such as, for example, first, second, third and fourth light-emitting diodes (LEDs) 312, 314, 316, and 318 may be mounted on the PCB 302. The first and third LEDs 312 and 316 may be mounted on one surface 308 of the PCB 302, while the second and fourth LEDs 314 and 318 may be mounted on the other surface 310 of the PCB 302. When the light pipe device 100 is fully engaged with the PCB 302, the proximal ends of the first, second, third, and fourth light pipes 102A, 102B, 102C, and 102D are located over and substantially optically aligned with the first, second, third, and fourth LEDs 312, 314, 316, and 318, respectively. Also, when the light pipe device 100 is fully engaged with the PCB 302, the spacer protrusions 124 and 126 may rest against the opposing surfaces 308 and 310, respectively, of the PCB 302 to help prevent the first and second leg portions 108 and 110 from directly contacting the LEDs 312-318.

Figure 5:
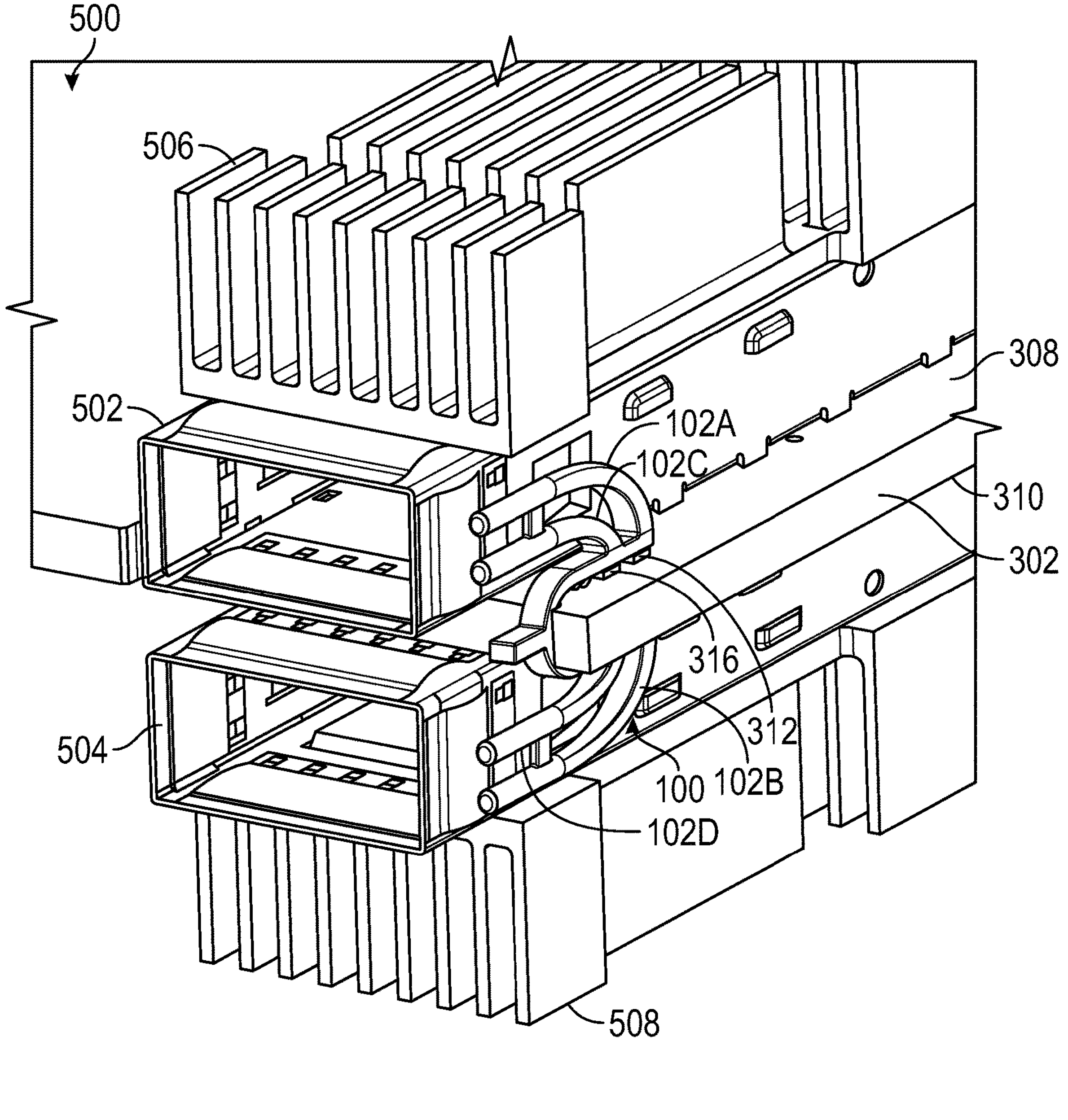
FIG. 5 is a perspective view of an electronic assembly that includes the light pipe device, the printed circuit board, and other elements, in accordance with an exemplary embodiment.

As illustrated in FIG. 5, an electronic equipment assembly 500 may include the light pipe device 100, the PCB 302, and other electronic or mechanical devices, such as, for example, optical transceiver receptacles 502 and 504, heat sinks 506 and 508, etc. Note that the heat sinks 506 and 508 extend over the light pipe device 100, which would make it challenging to mount conventional light pipes on the PCB 302 due to the reduced clearance. That is, the position of the heat sink 506 may interfere with vertical access to the surface 308 of the PCB 302 directly above the LEDs 312 and 316, and the position of the heat sink 508 may interfere with vertical access to the surface 310 of the PCB 302 directly above the LEDs 314 and 318 (not visible in FIG. 5). A light pipe device in accordance with the present disclosure addresses this challenge by enabling it to approach the PCB edge for mounting to the PCB (e.g., clipping onto the PCB edge), rather than having to approach the PCB surface from above for mounting to the PCB. The heat sinks 506 and 508 are intended only as examples of elements in an electronic assembly that may reduce clearance above LEDs or otherwise impede the mounting of light pipes; the PCB edge-clipped light pipe device 100 may be employed advantageously in various electronic assembly configurations, as will be appreciated by one of ordinary skill in the art. Further, while the term "PCB" is used in describing an exemplary method of mounting the exemplary light pipe device 100, it should be understood that embodiments of a light pipe device in accordance with the present disclosure may be configured in various alternative manners that may be conducive to attaching to other types of electronic assembly substrates.

Although not shown for purposes of clarity, a faceplate may be positioned on the front of the electronic equipment assembly 500. The faceplate may have, among other features, circular openings aligned with corresponding distal ends of the light pipes 102. When the LEDs 312-318 are illuminated, the light may be transmitted through the light pipes 102 and thus may be visible to the user of the electronic equipment assembly 500 through the holes in the faceplate. The faceplate may also rest against the extension 128, further helping to secure the light pipe device 100 in place.

One or more illustrative or exemplary embodiments of the invention have been described above. However, it is to be understood that the invention is defined by the appended claims and is not limited to the specific embodiments described.

What is claimed is:

1. A light pipe device, comprising:

a substantially U-shaped base having a central portion and first and second leg portions extending substantially parallel to each other from the central portion; and a first light pipe having a proximal end at the first leg portion, the first light pipe extending from the first leg portion away from a region between the first and second leg portions, the first light pipe having a distal end free of connection.

2. The light pipe device of claim 1, wherein the first light pipe is curved.

3. The light pipe device of claim 2, wherein an optical axis of the proximal end of the first light pipe is substantially normal to an inside surface of the first leg portion.

4. The light pipe device of claim 3, wherein an optical axis of the distal end of the first light pipe is substantially parallel to the first leg portion.

5. The light pipe device of claim 1, wherein the first leg portion has a detent extending from an inside surface of the first leg portion.

6. The light pipe device of claim 1, further comprising a second light pipe having a proximal end at the second leg portion, the second light pipe extending from the second leg portion away from the region between the first and second leg portions, the second light pipe having a distal end free of connection.

7. The light pipe device of claim 1, wherein the second light pipe is curved.

8. The light pipe device of claim 7, wherein an optical axis of the proximal end of the first light pipe is substantially normal to an inside surface of the second leg portion.

9. The light pipe device of claim 8, wherein an optical axis of the distal end of the second light pipe is substantially parallel to the second leg portion.

10. The light pipe device of claim 1, wherein the central portion of the base further include an extension portion parallel to the first and second leg portions and extending from the central portion in a direction opposite the first and second leg portions.

11. The light pipe device of claim 1, wherein the first and second leg portions are made of a resilient plastic material.

12. The light pipe device of claim 6, further comprising:

a third light pipe having a proximal end at the first leg portion, the third light pipe extending from the first leg portion away from the region between the first and second leg portions, the third light pipe having a distal end free of connection; and a fourth light pipe having a proximal end at the second leg portion, the second light pipe extending from the second leg portion away from the region between the first and second leg portions, the fourth light pipe having a distal end free of connection.

13. A method for mounting a light pipe device on an electronic assembly substrate, comprising:

attaching a substantially U-shaped base of the light pipe device to an edge of the substrate, including positioning the substrate between first and second leg portions extending from a central portion of the U-shaped base, and including positioning a proximal end of a first light pipe extending from the first leg portion over a light source on the substrate.

14. The method of claim 13, wherein attaching the substantially U-shaped base of the light pipe device to the edge of the substrate comprises at least one of the first and second leg portions resiliently deflecting against the substrate.

15. The method of claim 14, wherein attaching the substantially U-shaped base of the light pipe device to the edge of the substrate comprises a detent extending from an inside surface of at least one of the first and second leg portions engaging a recess in a surface of the substrate.

16. The method of claim 13, wherein attaching the substantially U-shaped base of the light pipe device to the edge of the substrate comprises the base engaging a notch in an edge of the substrate.

17. An apparatus, comprising:

means for attaching to an edge of a substrate; and means for transmitting light from a light source on the substrate proximate to the means for attaching to a location distant from the means for attaching.

18. The apparatus of claim 17, wherein the means for attaching comprises means for resiliently deflecting against the substrate.

19. The apparatus of claim 18, wherein the means for attaching comprises means for engaging a recess in a surface of the substrate.

20. The apparatus of claim 17, wherein the means for attaching comprises means for engaging a notch in an edge of the substrate.

* * * * *